US012754902B2

(12) United States Patent
Alwar et al.

(10) Patent No.: US 12,754,902 B2
(45) Date of Patent: Oct. 6, 2026

(54) ADAPTIVE FOLLOW-UP QUERY GENERATION FOR APPLICATIONS LEVERAGING LANGUAGE MODELS

(71) Applicant: Palo Alto Networks, Inc., Santa Clara, CA (US)

(72) Inventors: SathishKumar Alwar, San Jose, CA (US); Aleksandr Osipov, Los Gatos, CA (US); Haotian Liu, Santa Clara, CA (US); Anil Kumar Nandamuri, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/065,112

(22) Filed: Feb. 27, 2025

(65) Prior Publication Data

US 2026/0252556 A1 Aug. 27, 2026

(51) Int. Cl.
*G06F 16/242* (2019.01)
*G06F 16/28* (2019.01)

(52) U.S. Cl.
CPC .......... *G06F 16/243* (2019.01); *G06F 16/285* (2019.01)

(58) Field of Classification Search
CPC ............................ G06F 16/243; G06F 16/285
USPC ........................................................ 707/740
See application file for complete search history.

(56) References Cited

U.S. PATENT DOCUMENTS 12,271,411 B1 * 4/2025 Ezgi Akcora ....... G06F 16/3344
2017/0177660 A1 * 6/2017 Chang ................. G06F 16/2425
2024/0070152 A1 * 2/2024 Nagy ................ G06F 16/24539
2025/0245253 A1 * 7/2025 Mandal ............... G06F 16/3344
2025/0252320 A1 * 8/2025 Mayande ................ G06N 5/01

FOREIGN PATENT DOCUMENTS

WO WO-2024015321 A1 * 1/2024 ............ G06N 5/022

* cited by examiner

*Primary Examiner* — Kuen S Lu
(74) *Attorney, Agent, or Firm* — Gilliam IP PLLC

(57) ABSTRACT

A follow-up query generation system ("the system") proactively and dynamically generates follow-up queries based on user queries submitted to an application that interfaces with a language model(s). The system searches a knowledge base of various subject matter information to determine if the user query is semantically similar to descriptions of subject matter areas represented in the knowledge base. If the user query matches a description of a subject matter area based on semantic similarity, the system retrieves the corresponding knowledge from the knowledge base and invokes a language model with a prompt to generate the follow up queries based at least partly on the corresponding subject matter information. If knowledge is not found which is semantically similar, the system categorizes the user query and determines one or more related categories. The system queries the knowledge base to retrieve a set of pre-defined follow-up queries within the related category(ies).

20 Claims, 8 Drawing Sheets

ADAPTIVE FOLLOW-UP QUERY GENERATION FOR APPLICATIONS LEVERAGING LANGUAGE MODELS

BACKGROUND

The disclosure generally relates to data processing (e.g., CPC subclass G06F) and to handling natural language data (e.g., CPC subclass G06F 40/00).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLaMA. Foundation models are based on artificial neural networks including generative adversarial networks (GANs), transformers, and variational encoders. For instance, some large language models (LLMs) are based on transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning.

Multiple applications of foundation models in the field of natural language processing, particularly in the case of language models such as large language models (LLMs), have been realized. One such application is the use of language models for text-to-Structured Query Language (SQL) conversion. Text-to-SQL conversion refers to generating SQL queries representative of natural language text indicated in prompts. Language models used for text-to-SQL conversion can be pre-trained models adapted for this task with various techniques, such as prompt tuning, fine-tuning, or with one- or few-shot prompting using prompts engineered for the task of generating database queries from natural language text.

BRIEF DESCRIPTION OF THE DRAWINGS

Embodiments of the disclosure may be better understood by referencing the accompanying drawings.

DESCRIPTION

Figure 1:
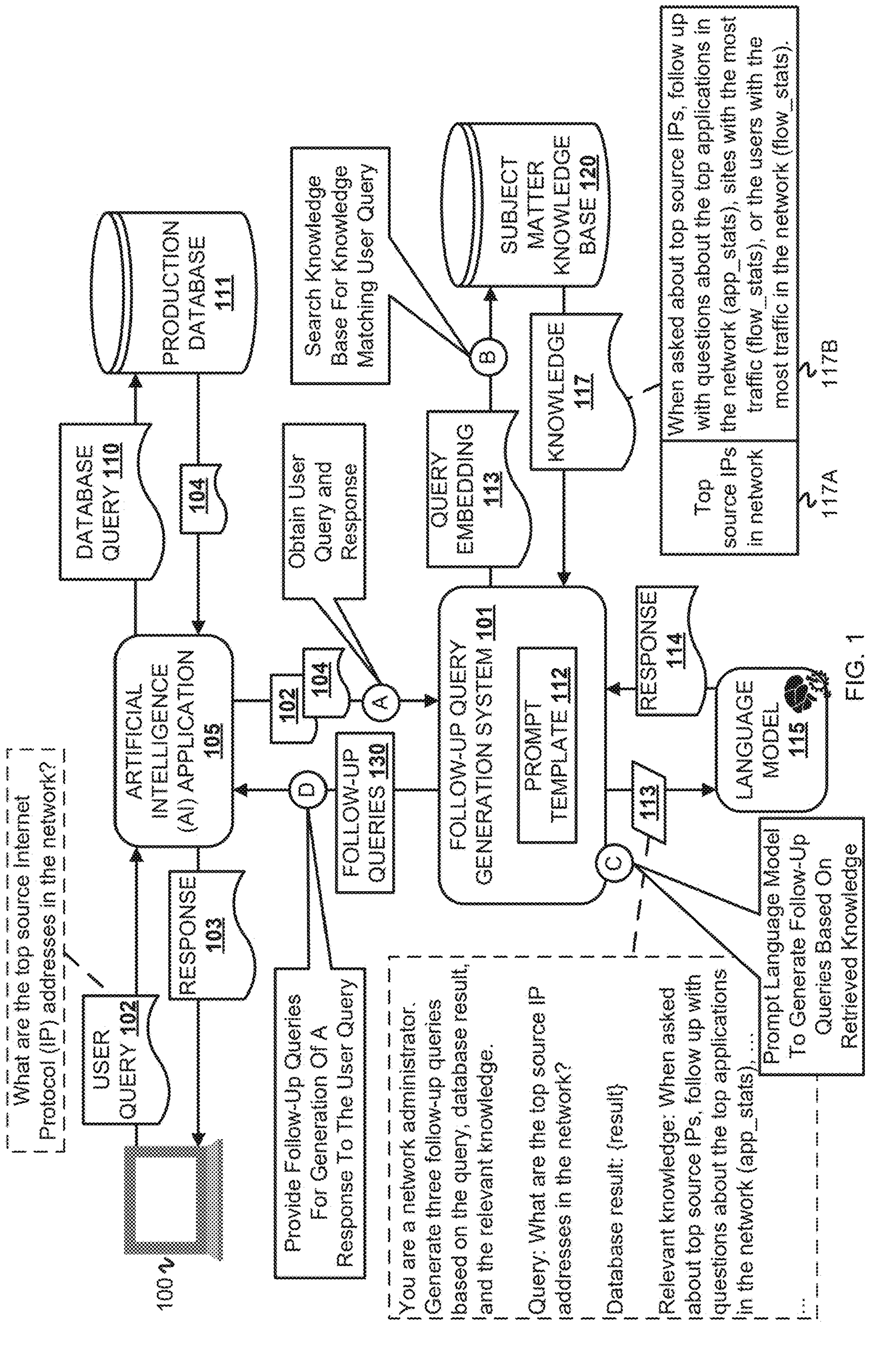
FIG. 1 is a conceptual diagram of a follow-up query generation system generating follow-up queries based on knowledge corresponding to a user query.

The description that follows includes example systems, methods, techniques, and program flows to aid in understanding the disclosure and not to limit claim scope. Well-known instruction instances, protocols, structures, and techniques have not been shown in detail for conciseness.

Terminology

A "prompt" refers to input to a foundation model, and prompting refers to the act of submitting a prompt to a model to perform inference based on the submitted prompt. A prompt at least includes a task for the model and one or more instructions for the task in natural language. A prompt can also include context, constraints, and examples. In other words, a prompt is a natural language task instruction(s) and other information that can assist the model in performing the task successfully. A prompt can have more than one task instruction, and prompts can be chained to incorporate responses from the model into a subsequent prompt. A prompt can be entered by a user and/or constructed from a prompt template.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Artificial Intelligence (AI)-based conversation systems often lack proactive capabilities to suggest relevant follow-up queries based on received user queries, which can increase problem resolution time and lead to lengthy conversations due to users having to come up with follow-up queries on their own. A follow-up query generation system is disclosed herein that proactively and dynamically generates follow-up queries based on received user queries. The follow-up query generation system (hereinafter simply the "follow-up system") assumes that a database query representing a user query has been generated and executed against a database to retrieve results that fulfill the user query. To generate follow-up queries to return along with the results that fulfill the user query, the follow-up system searches a knowledge base of various subject matter knowledge to determine if the user query is semantically similar to any descriptions of subject matter areas represented in the knowledge base. The knowledge base stores subject matter knowledge for various subject matter areas, where the subject matter knowledge corresponding to a subject matter area guides generation of follow up queries in that subject matter area. If the user query matches a description of a subject matter area based on semantic similarity, the follow-up system retrieves the corresponding knowledge from the knowledge base and constructs a prompt to a language model with instructions to generate a set of follow up queries based on the user query and the retrieved knowledge. The follow-up system invokes the language model with the prompt to generate the follow up queries. The generated follow-up queries are then served along with the results of the user query to the user that submitted the query, who can then select a follow-up query for subsequent fulfillment. If knowledge is not found which is semantically similar to the user query in the knowledge base, the follow-up system categorizes the user query into one of a set of categories and determines one or more related categories based on predetermined relationships among categories. The follow-up system queries the knowledge base for follow-up queries maintained therein corresponding to each of the related categories, thus providing related queries as follow-ups to the originally received query. By proactively generating relevant follow-up queries to a user query, the follow-up system reduces problem resolution time and provides for an improved user experience.

Example Illustrations

FIG. 1 is a conceptual diagram of a follow-up query generation system generating follow-up queries based on knowledge corresponding to a user query. FIG. 1 depicts an artificial intelligence (AI) application 105 which receives a user query 102 as part of a dialogue session between the AI application 105 and a client 100. The AI application 105 generates a database query 110 based on the received user query 102 and queries a production database 111 with the database query 110 to obtain a database query result ("result") 104 comprising data maintained in the production database 111 that satisfy the database query 110 and thus the user query 102. For instance, the AI application 105 can prompt a language model (not depicted in FIG. 1) to generate a database query that represents the user query 102 and is compatible with the production database 111. The production database 111 is owned/managed by an organization that also may own/manage the AI application 105. As an illustrative example, the production database 111 can maintain data pertaining to cybersecurity obtained by a cybersecurity service.

FIG. 1 also depicts a follow-up query generation system ("system") 101. The system 101 generates follow-up queries based on user queries. The system 101 determines if a knowledge base 120 has knowledge, or information corresponding to an area of subject matter, that is relevant to obtained user queries. The system 101 generates follow-up queries to obtain user queries using knowledge obtained from the knowledge base 120, if any.

FIG. 1 is annotated with a series of letters A-D representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated. The stages of operation described below presume that the AI application 105 as depicted in FIG. 1 has received the response 104 from the production database 111 in response to the database query 110 based on the user query 102.

At stage A, the system 101 obtains the user query 102 and result 104 generated in the course of a dialogue between the client 100 and the AI application 105. The AI application 105 may communicate query and response pairs obtained in the course of a dialogue session to the system 101 as part of generating a response to each user query. The user query 102 as depicted in FIG. 1 comprises the example natural language, "What are the top source internet protocol (IP) addresses in the network?". The corresponding response 104 is presumed to include data maintained in the production database 111 that provides a response to the user query 102, such as a listing of top source IP addresses in a network to which the client 100 corresponds.

At stage B, the system 101 searches the subject matter knowledge base 120 (henceforth "knowledge base") for knowledge matching the user query 102. The knowledge base 120 is a vector database comprising embeddings generated for a plurality of subject matter descriptions previously generated based on example user queries. Each embedding is associated with the corresponding subject matter description and knowledge for that subject matter description. Knowledge associated with a subject matter description can comprise instructions or guiding information that informs the generation of follow-up queries for queries corresponding to that subject matter description. The system 101 generates a query embedding 113 from the user query 102 using a text embedding model (e.g., word2vec, doc2vec, etc.), a sentence transformer, etc. The system 101 queries the knowledge base 120 with the query embedding 113 to retrieve knowledge in the knowledge base 120 corresponding to a subject matter description that is semantically similar to the user query 102, if any. Whether a subject matter description is sufficiently semantically similar to the user query 102 can be based on computed similarity scores between the query embedding 113 and the embeddings of subject matter descriptions (e.g., computed cosine similarities). For instance, the system 101 can query the knowledge base 120 for the entry corresponding to the most similar embedding to the query embedding 113 that also satisfies a similarity score threshold (e.g., a cosine similarity threshold, such as a threshold of 0.75).

FIG. 1 depicts the knowledge 117 found in response to querying the knowledge base 120. The knowledge 117 comprises a subject matter description 117A, which in this example has the subject matter description "Top source IPs in network". A similarity score between the query embedding 113 and the embedding of the subject matter description 117A is assumed to have satisfied the semantic similarity criterion (e.g., the cosine similarity threshold). The second part of the knowledge 117 also comprises subject matter information 117B. The subject matter information 117B comprises a set of instructions for generating follow-up queries corresponding to the subject matter area matching the subject matter description 117A, which includes indications of tables of the production database 111 that are relevant to the subject matter area and to which any generated follow-up queries should correspond. In this example, the subject matter information 117B comprises the instruction, "When asked about top source IPs, follow up with questions about the top applications in the network (app_stats), sites with the most traffic (flow_stats), or the users with the most traffic in the network (flow_stats)", where "app_stats" and "flow_stats" are tables of the production database 111.

At stage C, the system 101 generates a prompt 119 and submits the prompt 119 to a language model 115 (e.g., an LLM) to generate a set of follow-up queries based on the retrieved knowledge. The system 101 generates the prompt 119 based on a prompt template 112. The prompt template 112 comprises placeholders for a user query and the relevant knowledge to aid in generating follow-up queries to the user query. The prompt template 112 may also include a placeholder for the result 104. An example of the contents of the prompt template 112 is as follows:

{

Act like a network admin. You are given the previous query, its result from the database, and some relevant knowledge. Each follow-up option in the knowledge provided will have a label such as (incidents), (flow_stats), (app_stats), (app_health), (carrier_stats), (cpu_details), (interface_details), (disk_details), (link_health) or (memory_details). Your task is to generate three follow-up queries with their label for a previous query.

The previous query is: @query

Database result for this query: @response

Knowledge: @knowledge

Please generate three follow-up queries based on the previous query, database response, and relevant knowledge. Please follow these rules when generating the follow-up queries:

1. The queries should be relevant and logically flow from the previous query and the information provided.
2. The queries shouldn't be repetitive or redundant but should aim to gather additional useful information.
3. The queries should be concise and clear, avoiding unnecessary complexity.
4. The queries should be phrased in a professional and polite manner.
5. Do not use references such as "these", "the above" or "each of" in the follow-up queries, instead, directly use entity names provided in the database result when available.
6. When a list of entities is provided in the database result, use the first one in the follow-up queries.
7. Geographical entities such as "Beijing", "Hyderabad", and "Cupertino" should be treated as sites.
8. If the original query includes a site name (such as "Chennai"), do not ask questions about "sites in Chennai." Instead, generate follow-up queries that ask about other sites. The output should be formatted as a JSON instance that conforms to the JSON schema below.

As an example, for the schema {"properties": {"foo": {"title": "Foo", "description": "a list of strings", "type": "array", "items": {"type": "string"}}}, "required": ["foo"]}. The object {"foo": ["bar", "baz"]} is a well-formatted instance of the schema. The object {"properties": {"foo": ["bar", "baz"]}} is not well-formatted.

}

The system 101 populates the prompt template 112 with the user query 102, the result 104, and the subject matter information 117B to generate the prompt 119. The corresponding response 114 returned to the system 101 from the language model 115 comprises a set of follow-up queries 130 generated by the language model 115.

At stage D, the system 101 provides the follow-up queries 130 for generation of a response 103 to the user query 102. The system 101 extracts (e.g., copies) the content from the language model response 114 that corresponds to the follow-up queries 130 and indicates the follow-up queries 130 to the AI application 105. The AI application 105 generates the response 103 based on the follow-up queries 130 and the result 104 and serves the response 103 to the client 100. The response 103 comprises that of the data maintained in the production database 111 that satisfies the user query 102 and the follow-up queries 130.

Figure 2:
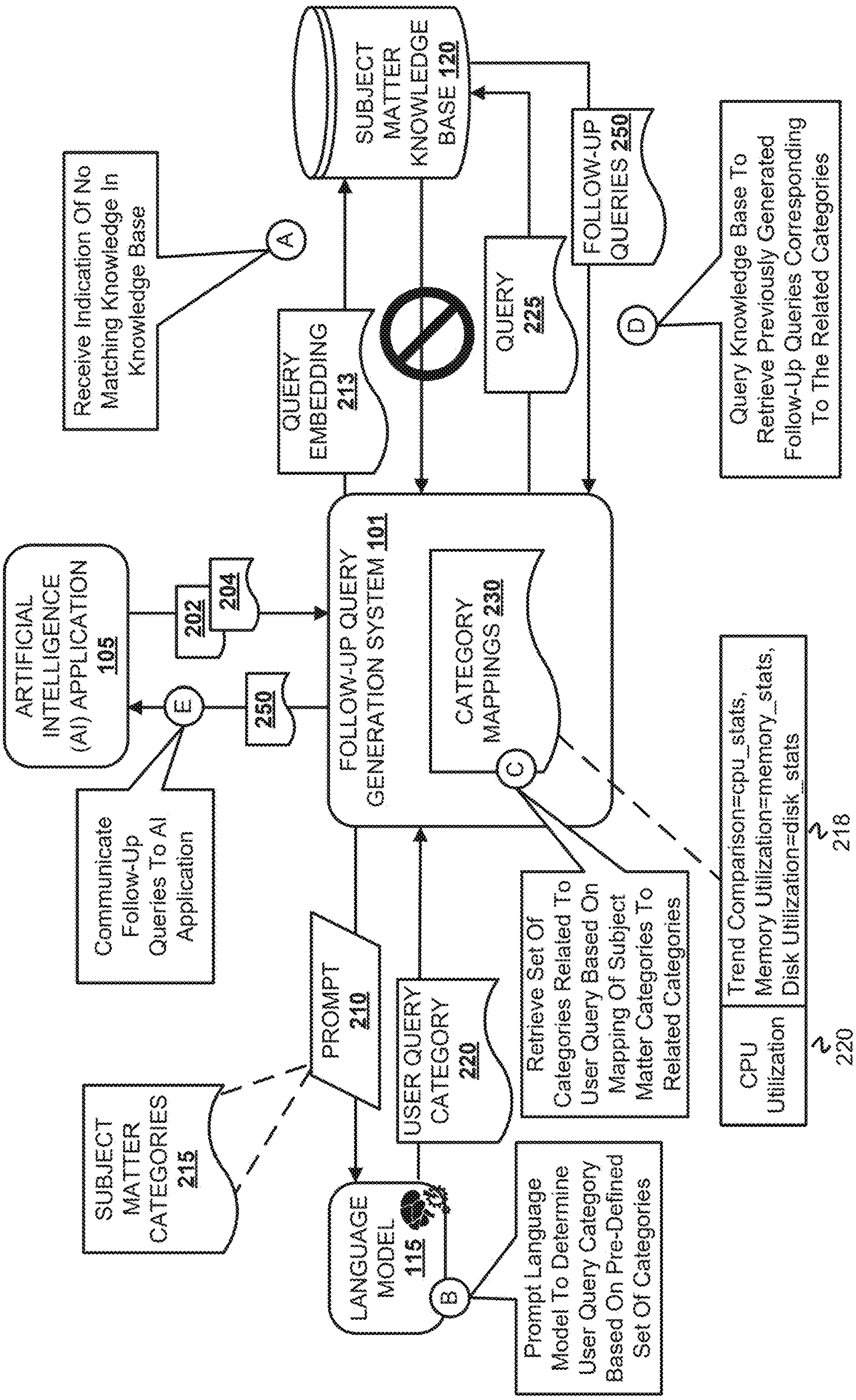
FIG. 2 is a conceptual diagram of generating follow-up queries to a user query based on categorization of the user query.

FIG. 2 is a conceptual diagram of generating follow-up queries to a user query based on categorization of the user query. FIG. 2 depicts an example in which querying the knowledge base 120 as described in FIG. 1 does not yield a finding of a subject matter description to which a user query is sufficiently semantically similar. FIG. 2 assumes that a user query 202 has been submitted to the AI application and that a corresponding database query execution result 204 has been obtained from execution of a database query representation of the user query 202 against the production database 111 of FIG. 1. In this example, the system 101 does not receive an indication of matching knowledge in the knowledge base 120 in contrast with the example depicted in FIG. 1.

In addition to the subject matter information described in reference to FIG. 1, the knowledge base 120 maintains pre-generated follow-up queries corresponding to various categories of subject matter information. Each of the pre-generated follow-up queries maintained in the knowledge base 120 can be associated with a category and feedback obtained from users to whom the follow-up query has been provided. Population of the knowledge base 120 with pre-generated follow-up queries is described in further detail in reference to FIG. 3.

FIG. 2 is annotated with a series of letters A-E representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the system 101 receives an indication of no matching knowledge in the knowledge base 120 based on a result of querying the knowledge base 120. The indication means that there is no subject matter description in the knowledge base 120 that is sufficiently semantically similar to the user query 202. As similarly described in reference to FIG. 1, the system 101 is presumed to have generated a query embedding 213 from the user query 202 (e.g., using a text embedding model or sentence transformer) and queried the knowledge base 120. Upon receiving the indication of no sufficiently semantically similar subject matter description in the knowledge base 120, the system 101 proceeds with an alternative approach to generating follow-up queries.

At stage B, the system 101 categorizes the user query 202 into one of a plurality of categories. The system 101 generates a prompt 210 based on a prompt template and prompts the language model 115 to determine to which category in a set of pre-defined subject matter categories 215 the user query 202 corresponds. The pre-defined set of subject matter categories 215 have been generated based on expert knowledge of subject matter areas of queries that can be submitted to the AI application 105. The prompt 210 comprises the listing of subject matter categories 215, examples of user queries and their corresponding ones of the subject matter categories 215, as well as the user query 202. For instance, the prompt template used for query categorization can comprise the subject matter categories 215, examples of user queries and their categories, and a placeholder for user queries that the system 101 populates with the user query 202. While this example depicts the language model 115 as categorizing the user query 202 based on engineering of a prompt for user query categorization, implementations can adapt the language model 115 for the task of categorizing user queries with other techniques, such as fine-tuning using example user queries and their categories. Additionally, while the language model 115 of FIG. 1 is depicted as performing categorization in FIG. 2, a different language model can be leveraged for user query categorization. The system 101 obtains a response to the prompt 210 from the language model 115 that comprises a user query category 220, or one of the subject matter categories 215 to which the user query 202 has been determined to correspond.

At stage C, the system 101 determines a set of related categories 218 that are related to the user query category 220 based on mappings 230 of subject matter categories to related categories ("category mappings 230"). The category mappings 230 comprises mappings of subject matter categories to sets of related subject matter categories, which may be a data structure that can be searched with a subject matter category to retrieve the one or more related categories associated with the subject matter category in the category mappings 230. The system 101 searches the category mappings 230 for the user query category 220 and retrieves a corresponding set of related subject matter categories, or the related categories 218. In this example, the user query category 220 is the example category "CPU Utilization". A lookup in the category mappings 230 with the user query category 220 returns related categories 218, which comprise the example categories "Trend Comparison", "Memory Utilization", and "Disk Utilization". As in FIG. 2, each of the related categories 218 can be associated with a table of the production database 111 of FIG. 1. To illustrate, the categories "Trend Comparison", "Memory Utilization", and "Disk Utilization" are associated with the database tables "cpu_stats", "memory_stats", and "disk_stats" in this example.

At stage D, the system 101 queries the knowledge base 120 to retrieve previously generated follow-up queries 250 corresponding to the related categories 218. As described in reference to stage C, the related categories 218 correspond to tables in the knowledge base 120. The system 101 generates a query 225 to the knowledge base 120 based on the related categories 218 to obtain a number N (e.g., N=3) of follow-up queries for each of the related categories 218. In some cases, the query 225 can specify that the N follow-up queries maintained in the knowledge base 120 with the best rankings/ratings should be obtained for each of the related categories 218. Each previously generated follow-up query in the knowledge base 120 can have a value(s) of corresponding feedback metric(s) associated therewith. Feedback metrics from users can comprise a scoring (e.g., a score of 1-5) assigned to previously generated follow-up queries, a binary rating indicating whether a previously generated follow-up query was helpful (e.g., a "yes" or "no" rating), etc. The system 101 can retrieve the previously generated follow-up queries for each of the related categories 218 with the best (e.g., highest) feedback ratings based on their assigned feedback score (or lack thereof). From the set of previously generated follow up queries, the system 101 can rank the follow-up queries across related categories to select the subset of the previously generated follow-up queries with the highest feedback scores to send to the user. For instance, the ranked set of previously generated follow-up queries across the related categories 218, the system 101 selects the top M follow-up queries to obtain the follow-up queries 250. In some cases, the system 101 may specify in the query 225 a minimum feedback score, rating, etc. such that follow-up queries with feedback metric values that satisfy the minimum are retrieved. The response to the query 225 from the knowledge base 120 comprises the follow-up queries 250 to be served to the user.

At stage E, the system communicates the set of follow-up queries 250 to the AI application 105. The AI application 105 then generates a response to the user query 202 based on the database query execution results 204 and the follow-up queries 250.

FIGS. 1 and 2 depict examples in which the system 101 is separate from the AI application 105. In implementations, the system 101 may be included within an AI application as a service or sub-system of the application that the AI application invokes as part of generating responses to user queries. In such cases, the system 101 generates follow-up queries based on being invoked by the AI application as similarly described in reference to FIGS. 1 and 2.

FIGS. 1 and 2 depict the knowledge base 120 and production database 111 as separate databases in this example to aid in understanding and explanation. In implementations, a knowledge base may be implemented with one or more tables of a production database such as the production database 111. To illustrate, the knowledge base 120 can instead be implemented as a table(s) of the production database 111 that stores associations between pre-generated follow up queries, their categories, subject matter information corresponding thereto, feedback, etc. In these examples, the system 101 queries the corresponding table(s) of the production database when querying the knowledge base.

Figure 3:
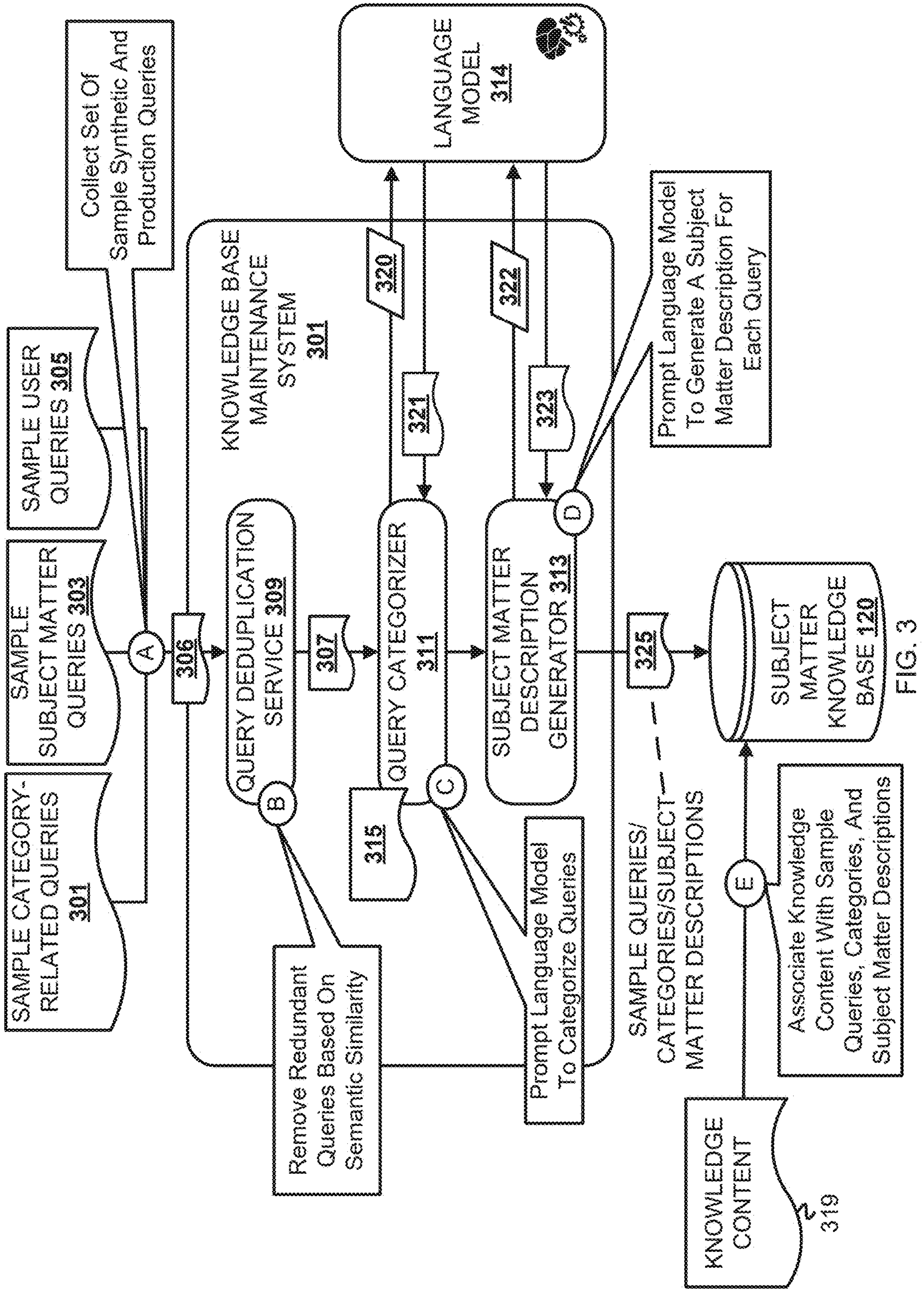
FIG. 3 is a conceptual diagram of building a knowledge base based on synthetic and production sample queries.

FIG. 3 is a conceptual diagram of building a knowledge base based on synthetic and production sample queries. The operations of FIGS. 1 and 2 presume that the knowledge base 120 previously described has been populated with subject matter descriptions and corresponding subject matter information. FIG. 3 depicts a knowledge base maintenance system 301 (henceforth "maintenance system") that builds and maintains the knowledge base 120. In order to build or update the knowledge base 120, the maintenance system 301 collects a plurality of synthetic and production sample queries ("sample query set 306"). The sample query set 306 is used by the maintenance system 301 to generate subject matter descriptions stored in the knowledge base 120. The maintenance system 301 associates subject matter information with each generated subject matter description to build the knowledge base 120.

FIG. 3 is annotated with a series of letters A-E representing stages of operations, each stage corresponding to one or more operations. Although these stages are ordered for this example, the stages illustrate one example to aid in understanding this disclosure and should not be used to limit the claims. Subject matter falling within the scope of the claims can vary from what is illustrated.

At stage A, the maintenance system 301 collects sample synthetic and production queries. The sample queries represented in FIG. 3 are examples of different types of queries that are collected by (e.g., retrieved from a respective database, indicated in an obtained file and/or user input, etc.) the maintenance system 301. The types include sample category-related queries 302, sample subject matter queries 303, and sample user queries 305. Sample category-related queries 302 are samples of synthetic queries (i.e., queries synthetically generated rather than obtained from a production environment) generated by a language model based on the subject matter categories 215 described in reference to FIG. 2. The sample subject matter queries 303 are samples of queries generated manually by a subject matter expert(s). The sample user queries 305 represent a set of queries gathered from a production environment (e.g., user queries obtained and stored by the AI application 105 of FIGS. 1 and 2). While the maintenance system 301 obtains the sample category-related queries 302, sample subject matter queries 303, and sample user queries 305 in this example, implementations can use sample queries from different sources and/or from a subset of the sources depicted in FIG. 3.

At stage B, a query deduplication service 309 of the maintenance system 301 removes redundant queries based on semantic similarity. The maintenance system 301 can compare queries in the set of sample query set 306 to determine if any two or more queries in the sample query set 306 are sufficiently semantically similar to each other to be determined as redundant. To determine if there are redundant queries, the maintenance system 301 can generate query embeddings for the sample query set 306 using a text embedding model (e.g., word2vec, doc2vec, etc.), a sentence transformer, etc. Semantic similarity can be determined by computing similarity scores between the generated embeddings of the queries (e.g., computed cosine similarities). For any set of queries that share a similarity score above a configured threshold, the maintenance system 301 deduplicates the queries in the set such that one of the set of similar queries remains in the sample query set 306. Deduplicating the sample query set 306 yields deduplicated queries 307.

At stage C, a query categorizer 311 of the maintenance system 301 prompts a language model 314 to categorize the deduplicated queries 307. The maintenance system 301 generates at least a first prompt 320 that comprises the deduplicated queries 307 as well as the subject matter categories 215. The prompt 320 also comprises examples of queries and their corresponding categories and a task instruction to categorize the deduplicated queries 307 into a corresponding one of the subject matter categories 215 based on the examples of categorizations. While depicted as a single prompt in FIG. 3, the query categorizer 311 can generate a sequence of prompts for categorizing the deduplicated queries 307, such as an individual prompt for each of the queries or a plurality of prompts for categorizing respective subsets of the queries. The query categorizer 311 prompts the language model 314 using the prompt 320 and receives a response 321 indicating the categories for each of the deduplicated queries 307. The query categorizer 311 associates each of the deduplicated queries 307 with their corresponding categories indicated in the response 321 (e.g., through labeling, tagging, etc.).

At stage D, a subject matter description generator 313 of the maintenance system 301 prompts the language model 314 to generate a subject matter description for each of the deduplicated queries 307. A subject matter description is a brief (e.g., 3-5 word) description of the subject matter to which a query corresponds. The maintenance system 301 generates a prompt 322 comprising the queries, their corresponding category labels, and a task instruction to generate a subject matter description for each query that is a designated number of words (e.g., 3-5 words). The subject matter description generator 313 prompts the language model 314 to generate a subject matter description for each query based on the content of the queries and their category labels by submitting the prompt 322 to the language model 314. While depicted as a single prompt in FIG. 3, the subject matter description generator 313 can generate a sequence of prompts for generating descriptions of the deduplicated queries 307, such as an individual prompt for each of the queries or a plurality of prompts indicating corresponding subsets of the queries. A response 323 from the language model 314 comprises a subject matter description for each of the queries that was sent to the language model 314. The subject matter descriptions generated at this stage are the descriptions maintained in the knowledge base 120 to which user queries are compared as described in reference to FIG. 1. Sample queries, categories, and subject matter descriptions 325 are then stored in the knowledge base 120, where each entry (e.g., row) of the knowledge base 120 can correspond to a sample query, its category, and the corresponding subject matter description.

At stage E, subject matter information 319 is associated with the sample queries, categories, and the subject matter descriptions stored in the knowledge base 120. Subject matter information can comprise one or more instructions that guide a language model to generate follow-up queries for user queries determined to correspond to each subject matter description. The subject matter information 319 may be generated based on expert knowledge and stored in the knowledge base 120 in association with each corresponding sample query, category, and subject matter description.

FIGS. 4-7 are flowcharts of example operations related to generating follow-up queries based on obtained user queries and maintaining a knowledge base used to generate follow-up queries. The example operations are described with reference to a follow-up query generation system and a knowledge base maintenance system (hereinafter "the generation system" and "the maintenance system," respectively) for consistency with FIGS. 1-3 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
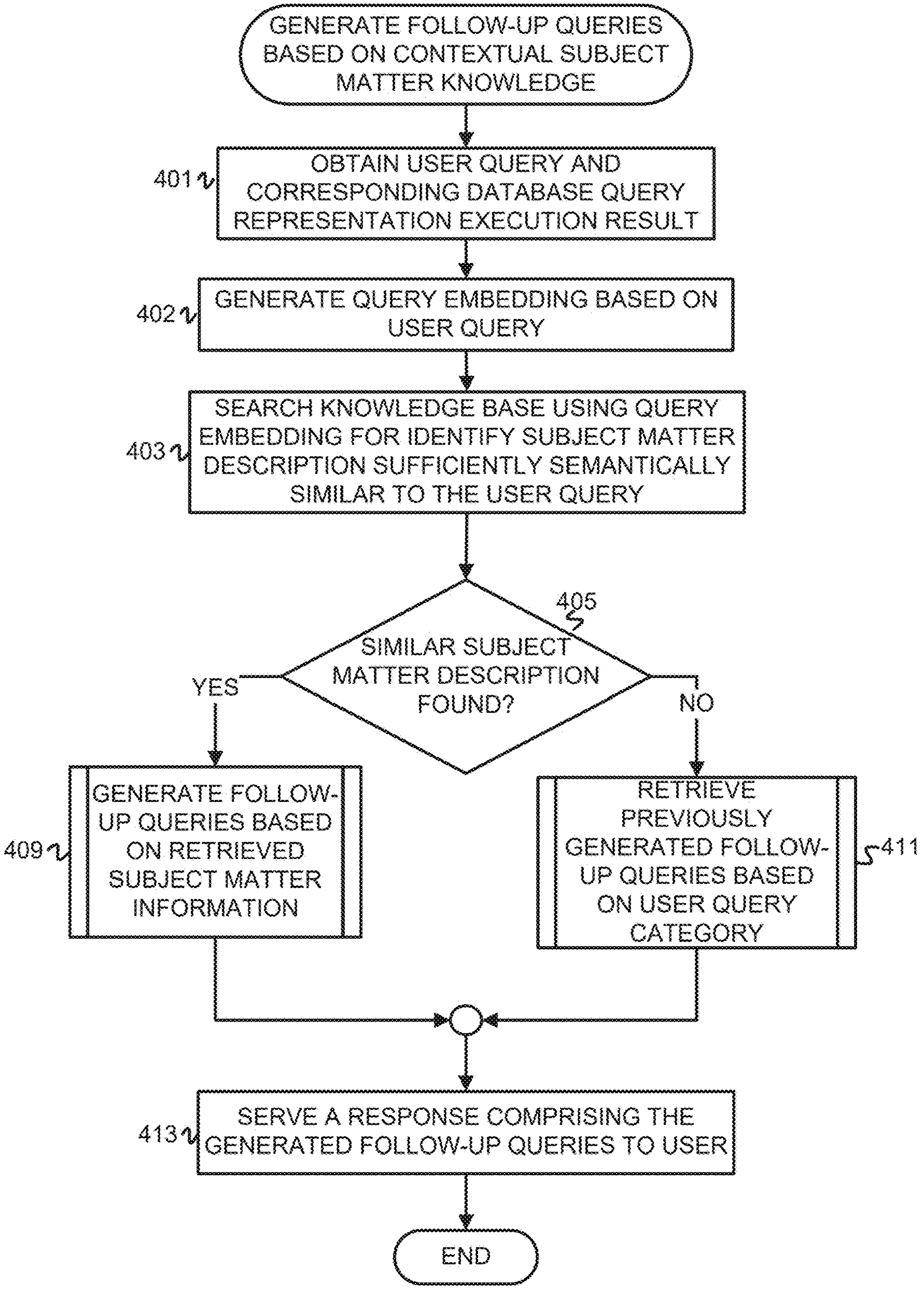
FIG. 4 is a flowchart of example operations for generating follow-up queries based on knowledge obtained in response to querying a knowledge base.

FIG. 4 is a flowchart of example operations for generating follow-up queries based on knowledge obtained in response to querying a knowledge base. At block 401, the generation system obtains a user query and a corresponding database query representation execution result. The generation system obtains user queries submitted by a client to an AI application that uses a dialogue system and the corresponding result from executing a database query representation of the user query against a production database.

At block 402, the generation system generates a query embedding based on the user query. The system can use a text embedding model (e.g., word2vec, doc2vec, etc.), a sentence transformer, etc. to generate an embedding representing the user query.

At block 403 the generation system searches a knowledge base using the query embedding to identify at least a first subject matter description that is sufficiently semantically similar to the user query. The knowledge base can be implemented as a vector database that stores associations between subject matter descriptions and corresponding information defined for each subject matter description that aids in follow-up query generation, where the vector database stores embeddings of the subject matter descriptions that have been generated therefrom. As another example, the knowledge base can be implemented as a table(s) of a production database against which database queries are executed to satisfy user queries. The generation system queries the knowledge base with the query embedding to identify a subject matter description sufficiently semantically similar to the user query based on the embeddings of subject matter descriptions stored in the knowledge base. The generation system can determine that a user query and a subject matter description are sufficiently semantically similar based on a similarity score between the embeddings computed by the knowledge base (e.g., cosine similarity). For instance, the generation system can be configured with a threshold similarity score, where a user query and a subject matter description are sufficiently semantically similar if the similarity score between their respective embeddings satisfies the threshold (e.g., a cosine similarity threshold of 0.75). In cases where the knowledge base has multiple subject matter descriptions for which the similarity score satisfies the threshold, the generation system can retrieve the most similar subject matter description (i.e., the subject matter description for which the computed similarity is the highest). If the search yields a finding of a subject matter description that is sufficiently semantically similar, the generation system obtains the corresponding information associated with the subject matter description. The information stored with each subject matter description in the knowledge base comprises one or more instructions that are used to guide a language model in generating follow-up queries for queries within that subject matter area. An example of information returned from the knowledge base is the instruction, "When asked about top applications, follow up with queries on number of users using these applications, or the number of source IP addresses using these applications, or top sites which are using these applications."

At block 405, the generation system determines if a sufficiently semantically similar subject matter description was found as a result of the search of the knowledge base. If the generation system identified a sufficiently similar subject matter description and thus obtained corresponding information associated with that subject matter description for follow-up query generation, then operational flow continues at block 409. Otherwise, operational flow continues at block 411.

At block 409, the generation system prompts a language model to generate follow-up queries based on the retrieved subject matter information. The generation system forms a prompt to the language model comprising the user query, the retrieved subject matter information, and a task instruction to generate one or more follow-up queries to the user query based on the retrieved subject matter information. The prompt can also include the result of executing the database query representation of the user query, as follow-up queries may include information that references the execution result. Generation of follow-up queries based on retrieved subject matter information is described in further detail in reference to FIG. 6.

At block 411, the generation system retrieves previously generated follow-up queries based on a category of the user query. The generation system retrieves one or more previously generated follow-up queries based on a subject matter category into which the user query falls. Retrieving previously generated follow-up queries for a user query based on the user query's category is described in further detail in reference to FIG. 5.

At block 413, the generation system serves the database query execution result and the generated follow-up queries to the user. The system generates a response comprising the database query execution result and the generated follow-up queries. The follow-up queries can then be selected by a user (e.g., by clicking a selectable element), which triggers forwarding of the selected follow-up query to the AI application. The follow-up queries may also be presented with a request for feedback, rating, etc. from the user. In such cases, the generation system receives the feedback, rating, etc. from the user and stores the feedback, rating, etc. in association with the follow-up query. If feedback or a rating were received for a previously-generated follow-up query that is semantically similar to the follow-up query (e.g., based on similarity scores of the corresponding vector representations), the feedback/rating of the previously-generated follow-up query can be updated to reflect the obtained feedback/rating (e.g., based on an aggregate numerical rating, a percentage of users that found the query helpful, etc.).

Figure 5:
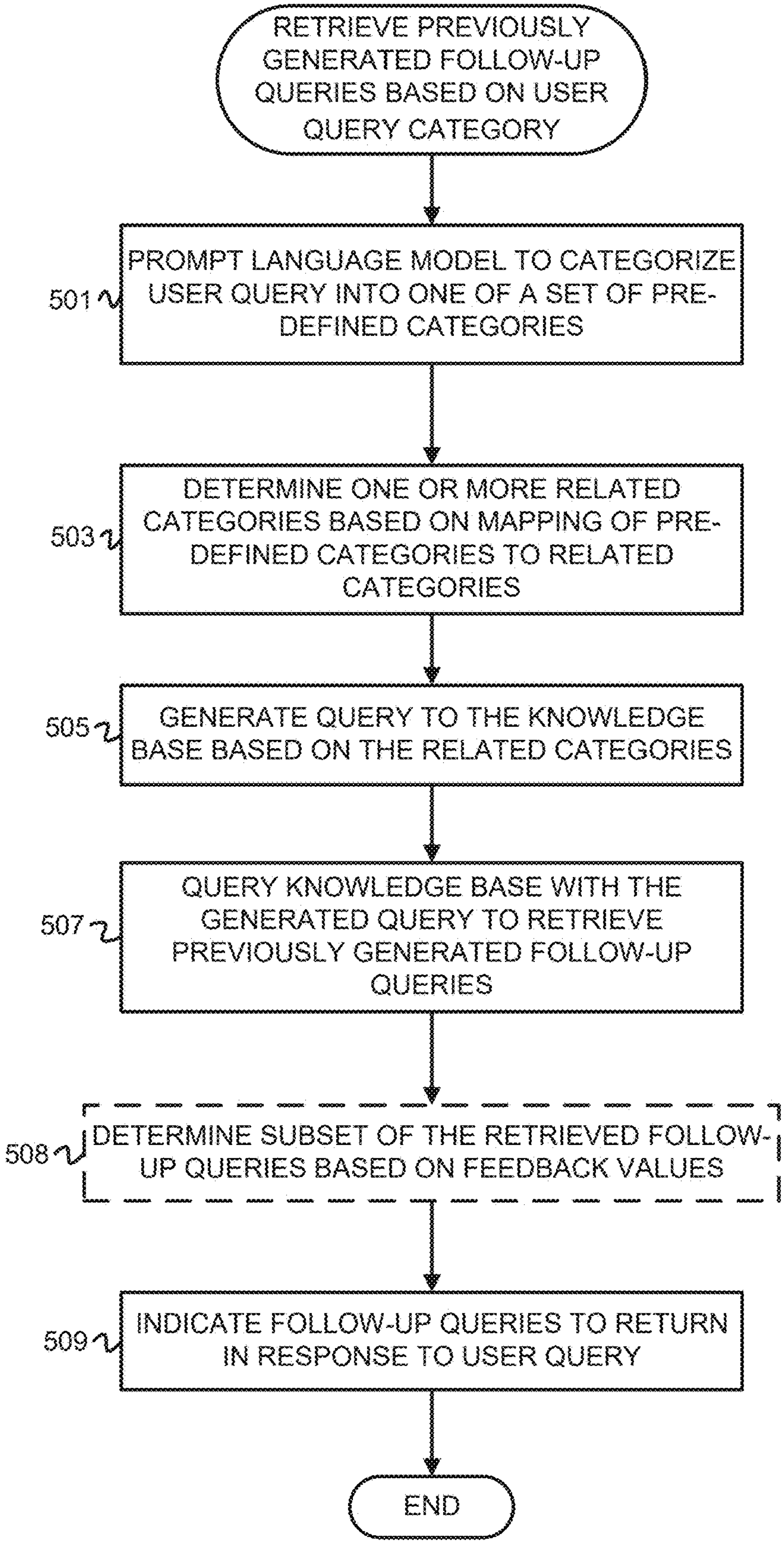
FIG. 5 is a flowchart of example operations for retrieving previously generated follow-up queries based on categorization of a user query.

FIG. 5 is a flowchart of example operations for retrieving previously generated follow-up queries based on categorization of a user query. The operations of this figure presume that the system's search of the knowledge base has not yielded any subject matter information corresponding to the user query.

At block 501, the generation system prompts a language model to categorize the user query into one of a set of pre-defined categories. The system may be configured with a prompt template that specifies a listing of categories which correspond to various subject matter areas. Categories can be general categories of subject matter areas or tied to features of an application. Examples of categories include "Top and bottom applications", "Top applications by Site", "Top applications by user", "Trend Comparisons", "Basic Retrieval", "Status", "Performance Analysis", and "Grouping and Aggregation". The prompt template can also include one or more examples of user queries and their corresponding categories from the listing of categories (e.g., for one- or few-shot prompting). The generation system populates the prompt template with the user query and submits the generated prompt to the language model. In other examples, a pre-trained language model can be trained further with fine-tuning on examples of query-category pairs to adapt the language model to the task of categorizing user queries. The response from the language model comprises an indication of the corresponding category into which the user query was categorized ("user query category").

At block 503, the generation system determines one or more related categories based on mappings of the pre-defined categories to related categories. The generation system has been configured with a mapping structure (e.g., a data structure that provides for storing associations between categories) that stores mappings of pre-defined categories to one or more related categories. Relationships between categories identified in the mapping structure have been previously determined based on expert knowledge and/or analysis (e.g., prompting a language model to identify relationships among the categories). The generation system performs a lookup in the mapping structure with the user query category to determine the set of related categories that correspond to the user query category in the mapping structure. The determined related categories each correspond to a table in the knowledge base which stores previously generated queries.

At block 505, the generation system generates a query to the knowledge base based on the determined related categories. Based on the related categories determined at block 503, the generation system constructs a query (e.g., a SQL query) to select previously generated queries maintained in the knowledge base that correspond to the related categories. The generation system can construct the query to retrieve a number N (e.g., N=3) of follow-up queries for each related category for which to retrieve follow-up queries. Each previously generated follow-up query can also have a corresponding feedback value(s) based on feedback obtained from users. In some cases, the generation system may construct the query to retrieve previously generated follow-up queries that satisfy a feedback value threshold(s). Feedback from users can comprise a scoring (e.g., a score of 1-5) assigned to the previously generated previously generated follow-up queries, a binary rating indicating whether a previously generated follow-up query was helpful (e.g., a "yes" or "no" rating), etc. The feedback metrics can also include popularity metrics for how often the pre-generated queries have been used in the last X days (e.g., X=30). The feedback metrics for each previously generated follow-up query can also indicate a proportion (e.g., percentage) of users who were presented with a similar follow-up query that rated the follow-up query as helpful. In some cases where feedback scores are stored as binary ratings, the generation system may only retrieve previously generated follow-up queries which indicate a positive (e.g., "yes") rating.

At block 507, the generation system queries the knowledge base with the generated query to retrieve pre-defined follow-up queries. The generation system submits the created query to the knowledge base and receives a set of previously generated follow-up queries in the response.

At block 508, the generation system determines a subset of the retrieved follow-up queries to return based on their corresponding feedback values. For instance, the generation system can rank the retrieved follow-up queries by feedback value(s) and select a top M (e.g., a top three) of the retrieved follow-up queries to return to the user such that the M highest rated, most helpful, etc. follow-up queries are selected from the retrieved set. Block 508 is depicted with dashed lines to illustrate it may be an optional operation based on the configuration of the generation system (e.g., a configurable setting of the generation system). However, this does not indicate that other example operations are mandatory.

At block 509, the generation system indicates the follow-up queries to return in response to the user query. The generation system can indicate the set of generated follow-up queries or, if a subset of the generated follow-up queries was selected at block 507, indicates the subset of follow-up queries. The retrieved previously generated follow-up queries will be presented to the user in response to the user query.

Figure 6:
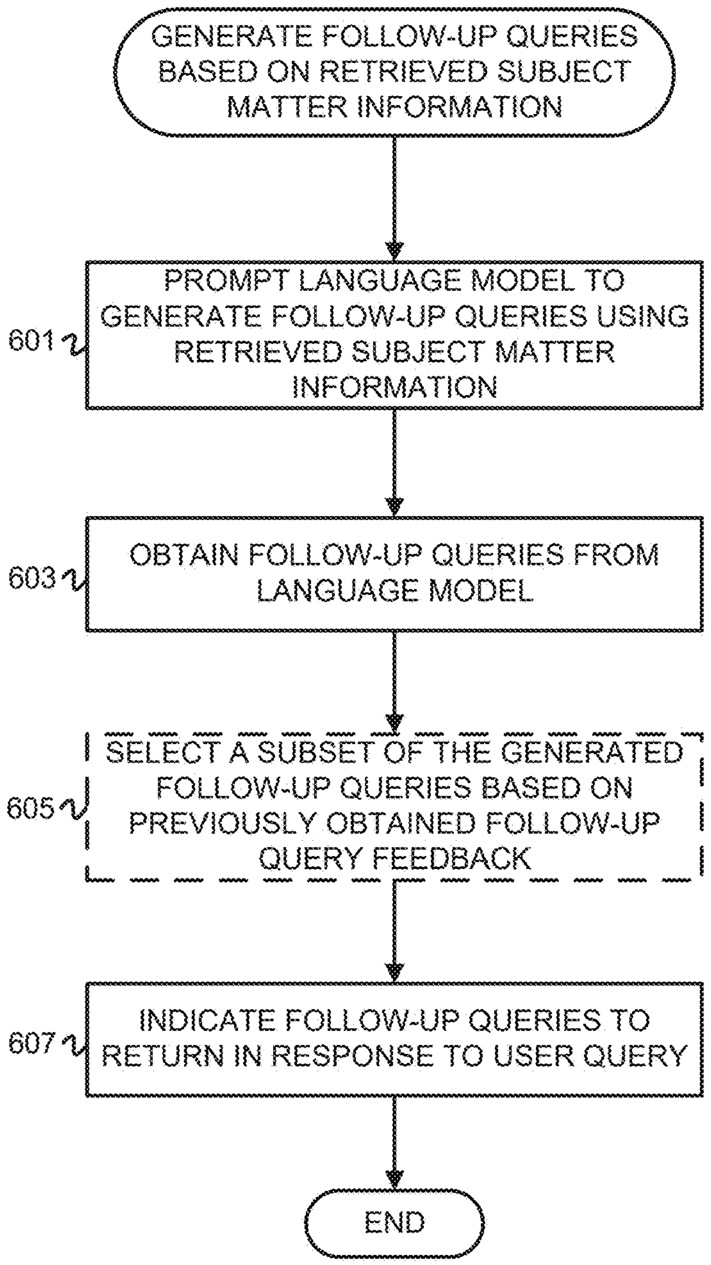
FIG. 6 is a flowchart of example operations for generating follow-up queries based on retrieved subject matter information.

FIG. 6 is a flowchart of example operations for generating follow-up queries based on retrieved subject matter information. The operations of FIG. 6 presume that a knowledge base has been queried as described in reference to FIG. 4 and the generation system has obtained subject matter information corresponding to the user query from the knowledge base.

At block 601, the generation system prompts a language model to generate follow-up queries using retrieved subject matter information. As previously described, subject matter information can be comprised of a set of instructions to inform the language model's generation of the follow-up queries by specifying certain types of queries it should generate. The subject matter information also can comprise general knowledge about the subject matter area that provides useful context to the language model when generating follow-up queries. The generation system can construct a prompt using a prompt template with which it has been configured. The prompt template comprises a task instruction to generate a set of follow-up queries (e.g., 3-5 queries) based on the retrieved knowledge, a placeholder for a database query execution result for a database query representation of the user query, and a placeholder for the user query itself. The prompt can specify guidance to be followed when generating the query. An example guideline the generation system can include in the prompt is that the generated follow-up queries should not be repetitive or redundant to each other or the user query. As another example, the prompt can specify that any specific entity names (e.g., site names) included in a follow-up query should be referenced with a placeholder rather than the specific name. Names of entities can thus be identified in the database query execution result and incorporated in the corresponding placeholder of a follow-up query. The prompt can also specify a format (e.g., JavaScript® object notation (JSON)) for the output of the response with the generated follow-up queries.

At block 603, the generation system obtains the follow-up queries from the language model. The number of follow-up queries the generation system obtains from the model is based on the number or number range (e.g., 3-5 follow-up queries) defined in the prompt to the language model.

At block 605, the generation system selects a subset of the generated follow-up queries based on previously obtained follow-up query feedback from users. In implementations, the generation system can rank the generated follow-up queries based on user feedback obtained for previously generated user queries and select a top M of the follow-up queries to return to the user. In such cases, the generation system can search the knowledge base to obtain feedback of previously generated user queries similar to the subset of generated follow-up queries and corresponding feedback metrics obtained from users. The generation system searches the knowledge base (or in some cases an external database if previously generated queries are separately stored) of previously generated queries to find queries that are semantically similar to each of the generated follow-up queries. If the database of previously generated queries is a vector database (e.g., the knowledge base or a table(s) of a production database to which the knowledge base corresponds), where each previously generated query has a corresponding embedding maintained therein, the generation system can generate embeddings for the generated follow-up queries and query the database of previously-generated queries with each generated embedding. For instance, the generation system can query the vector database with each embedding generated for a follow-up query for the most semantically similar previously generated query based on embedding similarities (e.g., cosine similarities), which may be subject to a similarity threshold. The feedback metrics can be a numerical rating of the query (e.g., from one to five), a "yes" or "no" rating of whether the follow-up query was helpful, etc. The feedback metrics for each previously generated follow-up query can also indicate a proportion (e.g., percentage) of users who were presented with a similar follow-up query that rated the follow-up query as helpful. The feedback metrics can also include popularity metrics for how often the pre-generated queries have been used in the last X days (e.g., X=30). From the set of follow-up queries generated by the language model for which feedback metrics of a most similar previously generated query were obtained, the generation system selects the most effective and useful queries based on the popularity and feedback metrics. For instance, the generation system can rank the follow-up queries by the feedback metrics and select the top M of the follow-up queries. Follow-up queries that are similar to previously generated queries determined to be helpful are thus prioritized for presentation to users. In implementations, if the generation system detects no queries semantically similar to a generated query, the generation system will consider the generated query as having no feedback or popularity metrics. Block 605 is depicted with dashed lines to illustrate it may be an optional operation based on the configuration of the generation system (e.g., a configurable setting of the generation system). However, this does not indicate that other example operations are mandatory.

At block 607, the generation system indicates the follow-up queries to return in response to the user query. The generation system can indicate the set of generated follow-up queries or, if a subset of the generated follow-up queries was selected at block 605, indicates the subset of follow-up queries. The follow-up queries will be presented to the user in response to the user query.

Figure 7:
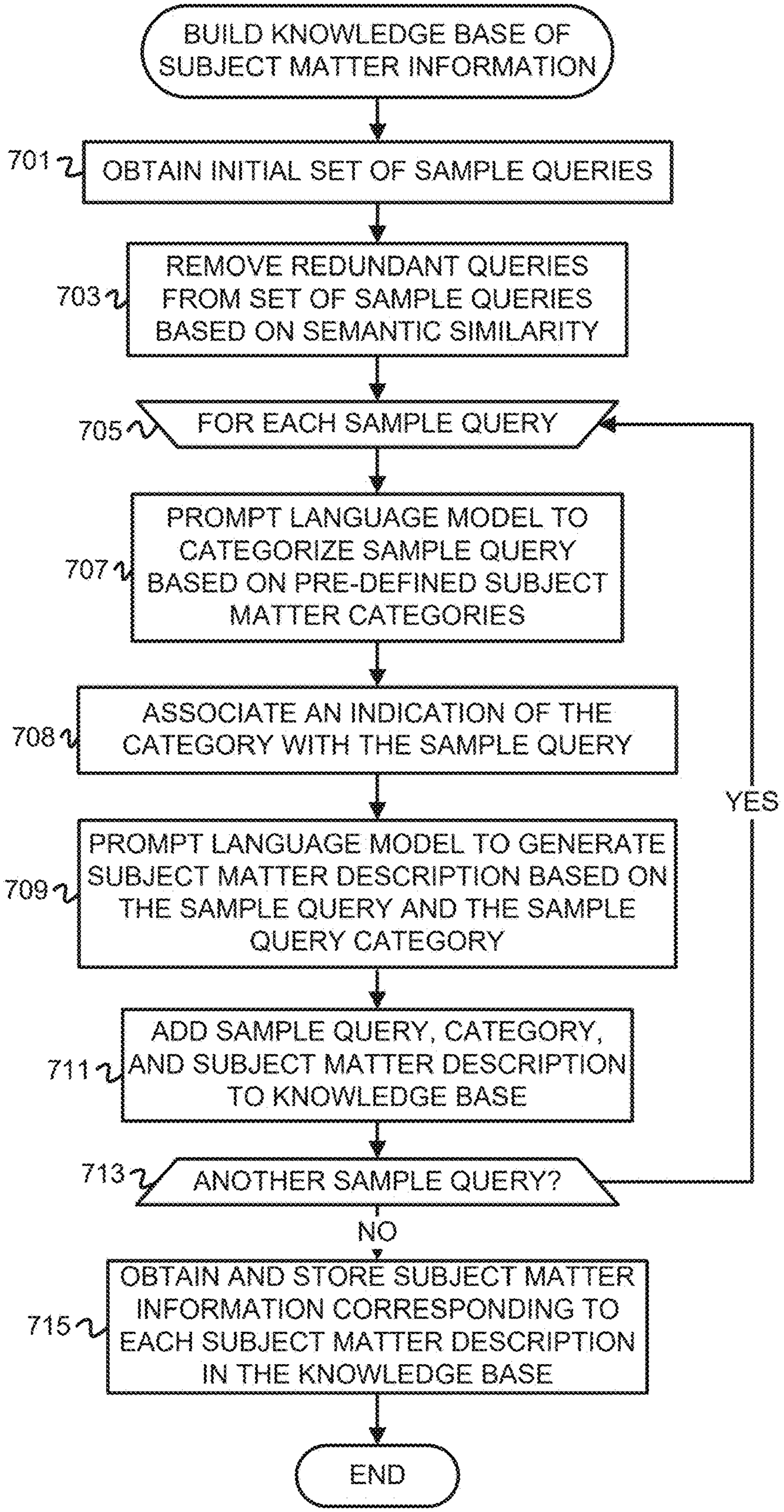
FIG. 7 is a flowchart of example operations for building a knowledge base of subject matter information.

FIG. 7 is a flowchart of example operations for building a knowledge base of subject matter information. The operations describe an example of populating a knowledge base with subject matter descriptions and corresponding information for each subject matter area to guide generation of follow-up queries pertaining to that subject matter.

At block 701, the maintenance system obtains an initial set of sample queries. The sample queries can be collected via retrieval from a respective database, an obtained file, and/or user input. Sample queries can include synthetic queries and/or production queries. Synthetic queries (i.e., queries that are synthetically created and not used in production environments) can be queries corresponding to a variety of subject matter areas generated by a language model. Additionally, synthetic queries can also be handcrafted by subject matter experts and/or based on domain knowledge. Production queries can be obtained by retrieving queries from a database of queries previously obtained from users during conversations between users and an AI application. Each sample query may be stored in a data structure that supports additional information being associated with the query (e.g., a subject matter description and category). In some implementations, the maintenance system may only use synthetic queries to populate the knowledge base based on how the maintenance system is configured.

At block 703, the maintenance system removes redundant queries from the sample queries based on semantic similarity. To determine if there are redundant queries, the maintenance system can generate query embeddings for the sample queries using a text embedding model (e.g., word2vec, doc2vec, etc.), a sentence transformer, etc. Semantic similarity can be determined by computing similarity scores between the generated embeddings of the queries (e.g., computed cosine similarities). For any set of queries that share a similarity score above a configured threshold (e.g., a cosine similarity threshold of 0.9), the maintenance system deduplicates the queries in the set such that one of the set of similar queries remains in the sample queries. Other natural language processing techniques can be employed for deduplicating the sample queries. For instance, the maintenance system can determine keywords of each of the sample queries. If any subset of the sample queries are determined to have a sufficient number of keywords in common (e.g., at least 80% of keywords) with other sample queries, the sample queries in the subset can be determined to be redundant.

At block 705, the maintenance system beings iterating through each sample query. This example depicts an implementation in which the maintenance system processes each of the sample queries individually. In other implementations, the maintenance system may perform the following operations for batches of the sample queries. For instance, the prompts generated at blocks 707 and 709 can indicate a batch of the sample queries rather than one sample query.

At block 707, the maintenance system prompts a language model to categorize the sample query based on pre-defined subject matter categories. The maintenance system can have a list or other data structure, a file, etc. which includes the pre-defined categories that the system incorporates into a prompt. The maintenance system builds a prompt that comprises the pre-defined categories and a task instruction to categorize the sample query into one of the pre-defined categories. The prompt may further include one or more examples of queries comprising natural language and their corresponding categories. An example prompt for categorizing a sample query is:

Given a set of queries, categorize each of them in the below categories:

Top and bottom applications,
Top applications by site
Top applications by user
Trend comparisons,
Basic retrieval,
Status,
Performance analysis,
Grouping and aggregation
Give output in the below JSON format:
{
["query": "Give me top 10 applications based on bandwidth",
"category": "top and bottom applications"]
}

At block 708, the maintenance system associates an indication of the category with the sample query. The response defines the category of the pre-defined categories the sample query to which the sample query was determined to correspond. The maintenance system can associate the sample query with its determined category by storing the category in a category field/element of a data structure that stores the sample query, labelling or tagging the sample query with an indication of the category, etc.

At block 709, the maintenance system prompts the language model to generate a subject matter description based on the sample query and the sample query's category. The maintenance system generates a prompt with a task instruction to generate a brief subject matter description for the sample query, such as a description that is a designated number of words (e.g., 3-5 words). The prompt can instruct the language model to generate the subject matter description based on the content of the sample query as well as the category of the sample query. While depicted as being performed sequentially in this example, implementations can combine categorization and subject matter description generation into a single prompt. In implementations, the maintenance system may combine the operations of blocks 707 and 709. In this case, the maintenance system can generate a prompt for both categorizing the sample query as well as generating a subject matter description of the sample query.

At block 711, the maintenance system adds the sample query, category, and the subject matter description to the knowledge base. The maintenance system stores the subject matter description, the sample query the subject matter description was based on, and its category in the knowledge base (e.g., in a row of a table corresponding to the knowledge base). In the case described in reference to FIG. 5 where the generation system does not find a sufficiently similar subject matter description for a user query in the knowledge base, the sample queries stored in the knowledge base serve as the previously generated queries which can possibly be served to the user as follow-up queries. In some implementations, the sample queries may additionally be stored in a separate database for maintaining user feedback.

At block 713, the maintenance system determines if there is another sample query to process. If there are no additional sample queries to process, then operational flow continues at block 715. Otherwise, operational flow returns to block 705.

At block 715, the maintenance system obtains and stores subject matter information corresponding to each subject matter description in the knowledge base. Subject matter information can comprise one or more instructions that guide a language model in generating follow-up queries for user queries determined to correspond to each subject matter description. The subject matter information may be generated based on expert/domain knowledge and stored in the knowledge base in association with each corresponding subject matter description. For instance, the maintenance system can obtain a file, user input, etc. that indicates the subject matter information in association with each subject matter description. The maintenance system inserts the subject matter information corresponding to a subject matter description in the knowledge base in association with the subject matter description.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, that employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 8:
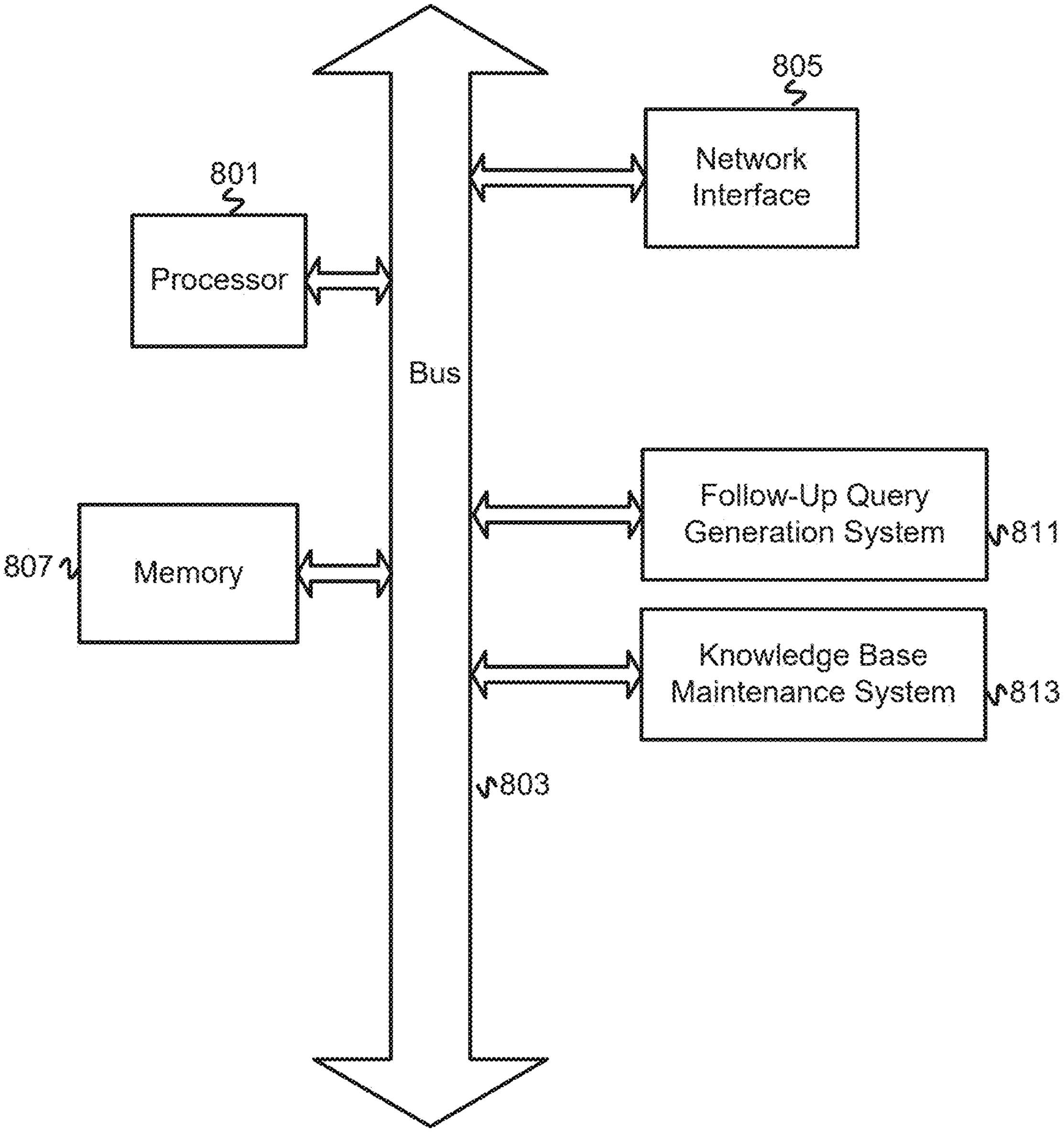
FIG. 8 depicts an example computer system with a follow-up query generation system and a knowledge base maintenance system.

FIG. 8 depicts an example computer system with a follow-up query generation system and a knowledge base maintenance system. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes follow-up query generation system 811 and knowledge base maintenance system 813 ("maintenance system"). The follow-up query generation system 811 generates follow-up queries based on obtaining a user query. The follow-up query generation system 811 generates an embedding for the user query and queries a vector database or other data store of subject matter information to obtain information corresponding to the user query. If the vector database yields subject matter information corresponding to the user query, the follow-up query generation system 811 prompts a language model with the retrieved subject matter information to generate a set of follow-up queries. If the vector database does not yield subject matter information corresponding to the user query, the follow-up query generation system 811 prompts a language model to categorize the user query and retrieves related categories based on an internal mapping of pre-defined categories to related categories. The follow-up query generation system 811 retrieves previously generated follow-up queries based on the related categories. The maintenance system 813 maintains the knowledge base of subject matter information used to assist the generation of follow-up queries. The maintenance system 813 categorizes each sample query in a set of sample queries. For each categorized sample query, the maintenance system 813 generates a subject matter description and stores the description along with corresponding subject matter information into the knowledge base. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:

based on obtaining a user query comprising natural language, determining if any of a plurality of subject matter descriptions satisfy a semantic similarity criterion for the user query, wherein the plurality of subject matter descriptions was previously generated based on a plurality of example user queries and correspond to a production database, wherein each of the plurality of subject matter descriptions comprises a description of subject matter to which the corresponding example user query corresponds, wherein determining if any of the plurality of subject matter descriptions satisfy the semantic similarity criterion for the user query comprises querying associations between the plurality of subject matter descriptions and corresponding information associated with the plurality of subject matter descriptions;

determining that a first subject matter description of the plurality of subject matter descriptions satisfies the semantic similarity criterion for the user query based on obtaining a result of querying the associations between the plurality of subject matter descriptions and corresponding information associated with the plurality of subject matter descriptions, wherein the result indicates first information associated with the first subject matter description;

generating a set of one or more follow-up queries to the user query comprising natural language based on the first information associated with the first subject matter description and the user query, wherein generating the set of one or more follow-up queries comprises prompting a language model to generate one or more queries comprising natural language as follow-ups to the user query based on the user query and the information associated with the first subject matter description; and indicating the set of follow-up queries in a response to the user query.

2. The method of claim 1, wherein prompting the language model to generate the one or more follow-up queries comprises prompting the language model with the first information associated with the first subject matter description and a task instruction to generate one or more queries comprising natural language based on the user query and the first information associated with the first subject matter description.

3. The method of claim 1, further comprising:

based on determining that none of the plurality of subject matter descriptions satisfy the semantic similarity criterion for the user query, categorizing the user query into a first category of a plurality of categories;

determining a subset of the plurality of categories to which the first category is related, wherein the subset of categories comprises one or more others of the plurality of categories;

obtaining one or more follow-up queries corresponding to the subset of categories; and indicating the one or more follow-up queries corresponding to the subset of categories in the response to the user query.

4. The method of claim 3, wherein categorizing the user query into the first category comprises prompting the language model with the user query, indications of the plurality of categories, and a task instruction to categorize the user query into one of the plurality of categories.

5. The method of claim 3, wherein obtaining the one or more follow-up queries corresponding to the subset of categories comprises, for each category in the subset of categories, obtaining at least a first follow-up query corresponding to the category, wherein the first follow-up query was previously generated.

6. The method of claim 3, wherein determining the subset of categories to which the first category is related comprises performing a lookup in a data structure with the first category, wherein the data structure maps each of the plurality of categories to one or more related ones of the plurality of categories.

7. The method of claim 1, further comprising obtaining a result of executing a database query representing the user query against the production database, wherein generating the set of follow-up queries comprises, prompting the language model to generate the one or more queries comprising natural language based on the user query, the information associated with the first subject matter description, and the result of executing the database query; and based on determining that a first follow-up query in the set of follow-up queries comprises a placeholder for a first entity, populating the placeholder with a name of the first entity identified from the result of executing the database query.

8. The method of claim 1, further comprising generating a first vector representing the user query, wherein the associations between the plurality of subject matter descriptions and corresponding information associated with the plurality of subject matter descriptions comprise a plurality of vectors representing the plurality of subject matter description, wherein querying the associations comprises querying the associations with the first vector for those of the plurality of vectors having a computed similarity to the first vector that satisfies a threshold, wherein determining that the first subject matter description satisfies the semantic similarity criterion for the user query comprises determining that a computed similarity between the first vector and one of the plurality of vectors corresponding to the first subject matter description satisfies the threshold.

9. The method of claim 1, further comprising, ranking the set of follow-up queries based on feedback received for previously generated follow-up queries; and selecting a top subset of the ranked set of follow-up queries, wherein indicating the set of follow-up queries comprises indicating the top subset of the ranked set of follow-up queries.

10. The method of claim 1, wherein the first information associated with the first subject matter description comprises at least one of instructions and guiding information to inform generation of follow-up queries for user queries corresponding to the first subject matter description.

11. One or more non-transitory machine-readable media having program code stored thereon, the program code comprising instructions to:

determine whether any of a plurality of subject matter descriptions satisfy a semantic similarity criterion for an obtained user query comprising natural language, wherein each of the plurality of subject matter descriptions was previously generated based on a corresponding one of a plurality of example user queries corresponding to a production database and comprises a description of subject matter to which the corresponding example user query corresponds, wherein the instructions to determine whether any of the plurality of subject matter descriptions satisfy the semantic similarity criterion comprise instructions to query stored associations between the plurality of subject matter descriptions and corresponding information associated with the plurality of subject matter descriptions with an indication of the user query;

determine that a first subject matter description of the plurality of subject matter descriptions satisfies the semantic similarity criterion based on a result of querying the stored associations between the plurality of subject matter descriptions and corresponding information associated with the plurality of subject matter descriptions;

generate a first set of follow-up queries to the user query comprising natural language based on information associated with the first subject matter description retrieved from querying the stored associations and the user query, wherein the instructions to generate the first set of follow-up queries comprise instructions to prompt a language model to generate one or more queries as follow-ups to the user query based on the information associated with the first subject matter description; and provide the first set of follow-up queries in a response to the user query.

12. The non-transitory machine-readable media of claim 11, wherein the program code further comprises instructions to:

based on a determination that none of the plurality of subject matter descriptions satisfy the semantic similarity criterion, categorize the user query into a first category of a plurality of categories;

determine one or more others of the plurality of categories to which the first category is related;

obtain a second set of follow-up queries corresponding to the one or more others of the plurality of categories, wherein the second set of follow-up queries were previously generated; and indicate the second set of follow-up queries in the response to the user query.

13. The non-transitory machine-readable media of claim 11, wherein the instructions to generate the first set of follow-up queries comprise instructions to prompt the language model with the information associated with the first subject matter description and a task instruction to generate the one or more queries comprising natural language as follow-ups to the user query based on the user query and the information associated with the first subject matter description, wherein the information associated with the first subject matter description comprises information to guide the language model in generating the one or more queries.

14. The non-transitory machine-readable media of claim 11, wherein the stored associations comprise a plurality of vectors generate for the plurality of subject matter descriptions, wherein the instructions to query the stored associations with the indication of the user query comprise instructions to query the stored associations with a vector representation of the user query, wherein the instructions to determine whether any of the plurality of subject matter descriptions satisfy the semantic similarity criterion comprise instructions to determine if a similarity score between the vector representation and any of the plurality of vectors satisfies a threshold.

15. An apparatus comprising:

a processor; and a machine-readable medium having instructions stored thereon that are executable by the processor to cause the apparatus to, determine, based on an obtained user query comprising natural language, if any of a plurality of subject matter descriptions satisfy a semantic similarity criterion for the user query, wherein the instructions executable by the processor to cause the apparatus to determine if any of the plurality of subject matter descriptions satisfy the semantic similarity criterion comprise instructions executable by the processor to cause the apparatus to query a database that maintains the plurality of subject matter descriptions and corresponding information associated with the plurality of subject matter descriptions with an indication of the user query, wherein the plurality of subject matter descriptions and corresponding information were previously generated based on a plurality of example user queries and correspond to a production database, wherein each of the plurality of subject matter descriptions comprises a description of subject matter to which the corresponding example user query corresponds;

determine that a first subject matter description of the plurality of subject matter descriptions satisfies the semantic similarity criterion for the user query based on obtaining a result of querying the database that comprises information associated with the first subject matter description;

generate a first set of follow-up queries to the user query comprising natural language based on the information associated with the first subject matter description and the user query, wherein the instructions executable by the processor to cause the apparatus to generate the first set of follow-up queries comprise instructions executable by the processor to cause the apparatus to prompt a language model to generate one or more follow-up queries to the user query based on the information associated with the first subject matter description; and indicate the first set of follow-up queries in a response to the user query.

16. The apparatus of claim 15, wherein the instructions executable by the processor to cause the apparatus to generate the first set of follow-up queries comprise instructions to prompt the language model with the information associated with the first subject matter description and a task instruction to generate the one or more follow-up queries to the user query based on the user query and the information associated with the first subject matter description, wherein the information associated with the first subject matter description comprises information to guide the language model in generating the one or more queries, wherein the first set of follow-up queries comprises the one or more follow-up queries generated by the language model.

17. The apparatus of claim 15, further comprising instructions executable by the processor to cause the apparatus to:

based on a determination that none of the plurality of subject matter descriptions satisfy the semantic similarity criterion, categorize the user query into a first category of a plurality of categories;

determine one or more others of the plurality of categories to which the first category is related;

obtain a second set of follow-up queries corresponding to the one or more others of the plurality of categories, wherein the second set of follow-up queries were previously generated; and indicate the second set of follow-up queries in the response to the user query.

18. The apparatus of claim 17, wherein the instructions executable by the processor to cause the apparatus to determine the one or more others of the plurality of categories to which the first category is related comprise instructions executable by the processor to cause the apparatus to perform a lookup in a data structure with the first category, wherein the data structure maps each of the plurality of categories to one or more related ones of the plurality of categories.

19. The apparatus of claim 15, wherein the database comprises a plurality of vectors generated for the plurality of subject matter descriptions, wherein the instructions executable by the processor to cause the apparatus to query the database with the indication of the user query comprise instructions to query the database with a vector representation of the user query, wherein the instructions executable by the processor to cause the apparatus to determine if any of the plurality of subject matter descriptions satisfy the semantic similarity criterion comprise instructions executable by the processor to cause the apparatus to determine if a similarity score between the vector representation of the user query and any of the plurality of vectors satisfies a threshold.

20. The apparatus of claim 15, further comprising instructions executable by the processor to cause the apparatus to obtain a result of executing a database query representing the user query against the production database, wherein the instructions executable by the processor to cause the apparatus to generate the first set of follow-up queries comprise instructions executable by the processor to cause the apparatus to, prompt the language model to generate the one or more follow-up queries based on the user query, the information associated with the first subject matter description, and the result of executing the database query; and based on a determination that a first follow-up query in the first set of follow-up queries comprises a placeholder for a first entity, populate the placeholder with a name of the first entity identified from the result of executing the database query.

* * * * *